April 26, 1966  F. S. GARCIA  3,247,996

PLASTIC BOTTLE CONTAINER

Filed March 2, 1961

INVENTOR
F. S. GARCIA

BY *Young & Quigg*

ATTORNEYS

April 26, 1966     F. S. GARCIA     3,247,996
PLASTIC BOTTLE CONTAINER

INVENTOR
F. S. GARCIA
BY
Young & Quigg
ATTORNEYS

April 26, 1966   F. S. GARCIA   3,247,996
PLASTIC BOTTLE CONTAINER
Filed March 2, 1961   3 Sheets-Sheet 3

INVENTOR
F. S. GARCIA
BY  *Young & Quigg*
ATTORNEYS

United States Patent Office

3,247,996
Patented Apr. 26, 1966

3,247,996
PLASTIC BOTTLE CONTAINER
Felix Santamaria Garcia, Vigo, Spain, assignor, by mesne assignments, to Phillips Petroleum Company, a corporation of Delaware
Filed Mar. 2, 1961, Ser. No. 92,837
Claims priority, application Spain, Apr. 22, 1960, 257,550
10 Claims. (Cl. 220—21)

This invention relates to plastic containers, and more specifically to a plastic container for holding bottles and the like in spaced predetermined relationship, and to a process of making such a container.

Containers for relatively heavy bottles, metal cans and similar receptacles which are to be individually available from the container and are to be held in spaced relationship in a predetermined position are conventionally assembled from a relatively large number of component elements in an operation involving numerous steps and requiring a fairly large expenditure in labor.

A primary object of the invention is the provision of a container for the aforedescribed purpose which required but a minimum of labor in its manufacture.

Another object is the provision of a container which requires but a very small number of manufacturing steps.

A further object is the overall reduction in the cost of such containers.

Yet the invention aims at providing a container which is inherently sturdier than conventional containers for bottles and the like, is easier to handle and can be stored in a smaller space.

Other objects and many of the attendant advantages of this invention will be readily appreciated as the same becomes better understood by reference to the following detailed description when considered with the accompanyings wherein.

Figure 1B:
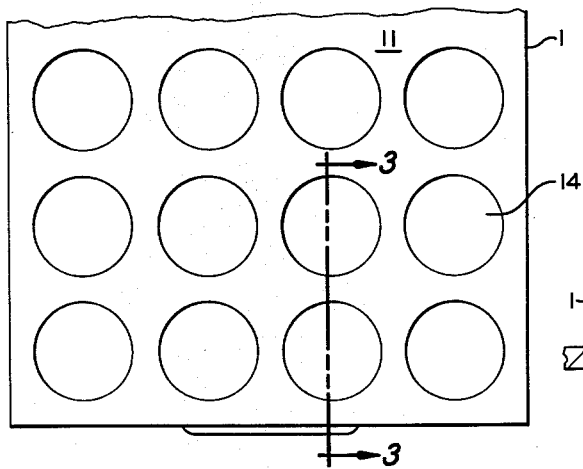
FIG. 1b illustrates the apparatus shown in FIG. 1a in a fragmentary plan view.

Referring now to the drawing in detail, and initially to FIGS. 1 to 5, there is seen a container for milk bottles consisting basically of a unitary rectangular box-like structure 1 having a top wall 11, a bottom wall 12, and a side wall 13 between the top and bottom walls. The box 1 is molded of plastic. Polyethylene, cellulose acetate-butyrate, and rigid polyvinyl chloride are examples of thermoplastic materials from which the box 1 may be constructed by conventional molding techniques. The box 1 is preferably molded in a single piece. Blow molding, injection molding and other conventional plastic molding operations may be resorted to for making the blank from which the box is made, as will be discussed in more detail hereinafter.

The top wall 11 is formed with spaced circular apertures 14 the axes of which are arranged in a quadratic pattern. The diameters of the apertures 14 conform approximately to the diameter of the milk bottles 15 of which only one is shown, and which are intended to be held in the container. The height of the box, that is the spacing of the top wall 11 from the bottom wall 14, is smaller than the height of the bottle 15 so that the latter projects upward from the box 1.

Figure 2:
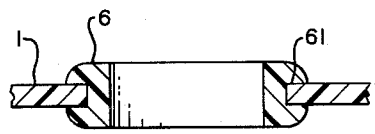
FIG. 2 shows a modified detail of the apparatus of FIGS. 1a and 1b in side elevational section.
Figure 1A:
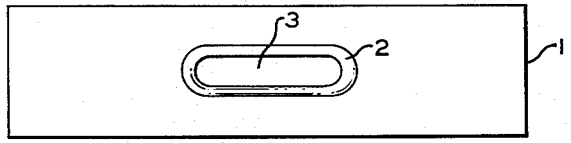
FIG. 1a shows a side elevation of a preferred embodiment of the invention.

The container of the invention may be adjusted for holding bottles of a diameter substantially smaller than that of the apertures 14 by means of inserts 6 shown in FIG. 2. The inserts are of annular shape and have an external circumferential groove 61 the bottom of which has a diameter about equal to that of the apertures 14. In the assembled condition of the insert 6, the groove 61 engages the edge of the top wall 11 in the aperture 14.

The inserts 6 are preferably made of thermoplastic material which, when softened by heat permits the insert 6 to be put in place, and to be securely held in the aperture 14 when it hardens on cooling. Alternately, the inserts 6 are originally made of a size small enough to permit their coaxial passage through the apertures 14. They are then softened by heat and mechanically expanded by a conical mandrel cooperating with a backing plate until they assume the position and configuration illustrated in FIG. 2, whereupon they are permitted to harden by cooling. Polyethylene is a suitable material for these inserts. Its resiliency provides a desirable cushioning effect for a bottle held in the aperture 14.

The internal face of the bottom wall 12 of the box 1 has a system of integral reinforcing ribs 7 arranged in two groups of spaced parallel members which intersect to form a quadratic network on the bottom wall 12. The ribs together with portions of the bottom wall 12 form a plurality of shallow quadratic cells the centers of which are aligned with the axes of respective apertures 14. Each cell is thus positioned to receive the bottom of a bottle 15, and to prevent lateral movement thereof.

Two opposite ones of the four rectangularly offset portions of the side wall 13, which is otherwise uninterrupted, are formed with slots 3 which are elongated in a direction parallel to the top and bottom walls of the box 1. The slots 3 provide convenient handles for carrying the box 1. An annular insert 2 is inserted in each of the slots 3 and conforms thereto. The insert 3 is of U-shaped cross section, as best seen from FIG. 5. It is made of thermoplastic material and may be inserted by either one of the two methods described for insertion of the inserts 6 in the top wall 11. It will be understood that expansion of an originally smaller insert 6 into its final shape will require a wedge-shaped or pyramidal mandrel.

Figure 6:
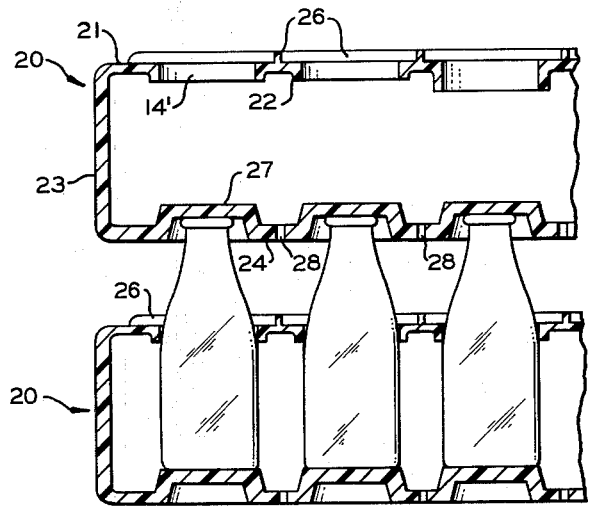
FIG. 6 is an elevational sectional view of a portion of another preferred embodiment of the invention.
Figure 7:
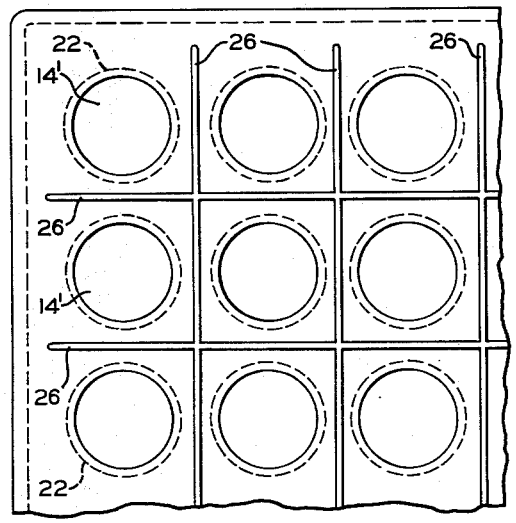
FIG. 7 is a plan view of the apparatus of FIG. 6.

A modified embodiment of the container of the invention is illustrated in FIGS. 6 and 7. It consists basically of a rectangular box structure 20 closely similar to that of the aforedescribed first embodiment but having rounded edges C. Its top wall 21 is formed with circular apertures 14' arranged in a quadratic pattern. Adjacent the apertures 14' and surrounding the same, the inside of the top wall 21 carries integral annular ridges 22 the central openings of which are coaxial with respective apertures 14' and of equal diameter so as to form continuous passages therewith. As can be seen from FIGURE 6, the axial height of the annular ridges 22 increases as the distance from the outer wall 23 increases. The increased axial height of annular ridges 22 provides increased rigidity to top wall 21 as the distance from the outer wall 23 increases.

The outer face of the top wall 21 has integral ribs 26 arranged thereon. The ribs form two groups of parallel members which intersect at right angles to define a pattern of quadratic cells each of which is concentric with one of the apertures 14'. The ribs increase the rigidity of the top wall 21, and the same function is also performed by the ridges 22. The height of these ridges increases in a direction away from the side wall 23 of the box 20 as is best seen from FIG. 6. The ribs 26 are of approximately semi-cylindrical shape and formed with an axially extending cavity 25 for improved torsional strength.

The bottom wall 24 of the box 20 extends mainly in a plane, but approximately circular portions 27 thereof are displaced toward the top wall 21 in such a manner as to form frustoconical projections on the inside bottom of the box 20, and corresponding frustoconical recesses in the outside face of the bottom wall 24. The bottom wall portions 27 are spaced in a quadratic pattern corresponding to that of the apertures 14' in the top wall 21, and the apertures 14' are approximately coaxial with respective circular portions 27.

This partial displacement of the bottom wall 24 not only increases the rigidity of the bottom wall, but it also permits a particularly advantageous method of stacking several bottle containers of the invention as shown in FIG. 6. Two boxes 20 are superimposed in such a manner that the bottle tops of the lower box enter the frustoconical recesses in the bottom wall of the box, thus providing a stack of great lateral stability. The frustoconical shape of the projection inside the box 20 facilitates access to the internal face of the bottom wall 24 for cleaning purposes, and permits complete discharge of liquids from the box 20 through a drainage opening 28 in the bottom wall 24. A plurality of such openings may be provided instead of the single opening 28 shown in FIG. 6.

Figure 8:
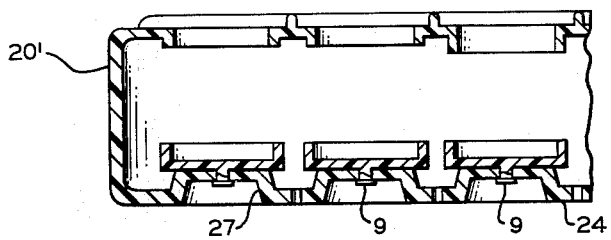
FIG. 8 shows yet another embodiment of the invention in a view corresponding to that of FIG. 6.
Figure 9:
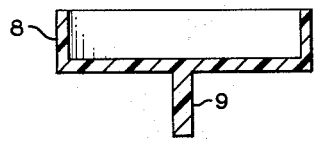
FIG. 9 shows an element of the apparatus of FIG. 8 prior to assembly, the view being on an enlarged scale.
Figure 10:
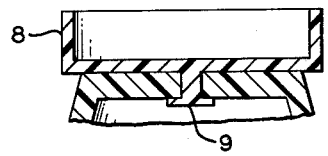
FIG. 10 illustrates the element of FIG. 9 assembled with a portion of the remaining apparatus of FIG. 8, on a less enlarged scale.

The embodiment of the invention illustrated in FIGS. 8 to 10 has a basic box structure 20' substantially identical with box 20 of FIGS. 6 and 7, but having a central bore in each of the circular portions 27 of the bottom wall 24. A cylindrical dish 8 of relatively small height is mounted on each of the bottom wall portions 27 by means of an integral stem 9. To fasten a dish 8 on the corresponding bottom wall portion 27, the dish which is of thermoplastic material, such as polyethylene, is positioned on the bottom wall by passing its stem through the central bore of a wall portion 27, and then fusing and flattening the portion of the stem 9 which passes outward of the bore so as to form a rivet head thereon which securely holds the dish in place. The cylindrical rim of the dish 8 holds a bottle or the like against lateral displacement in the box 20'. The rivet head on the stem 9 should have as little height as is consistent with mechanical strength requirements so as not to interfere with insertion of a bottle top into the frustoconical recess of the bottom wall 24 when several boxes 20' are stacked.

Figure 3:
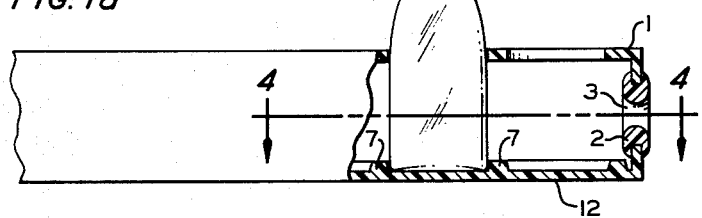
FIG. 3 shows the apparatus of FIG. 1b in elevational section on the line III—III.
Figure 4:
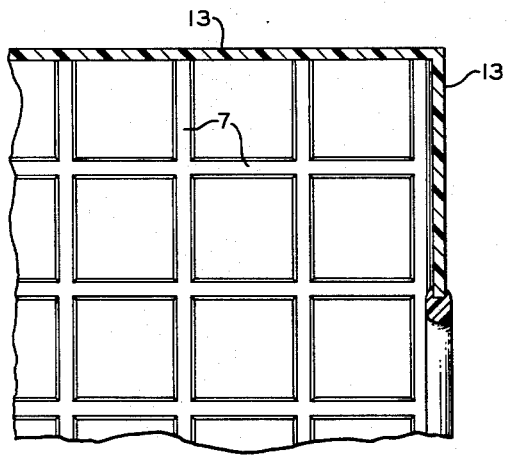
FIG. 4 is a fragmentary sectional plan view of the apparatus of FIGS. 1a and 1b, the section being taken on line IV—IV of FIG. 3.
Figure 5:
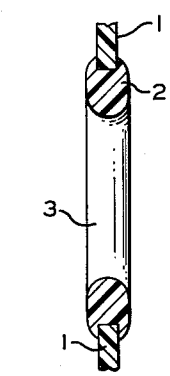
FIG. 5 is a fragmentary sectional front elevational view of the apparatus of FIG. 1a on an enlarged scale.
Figure 11:
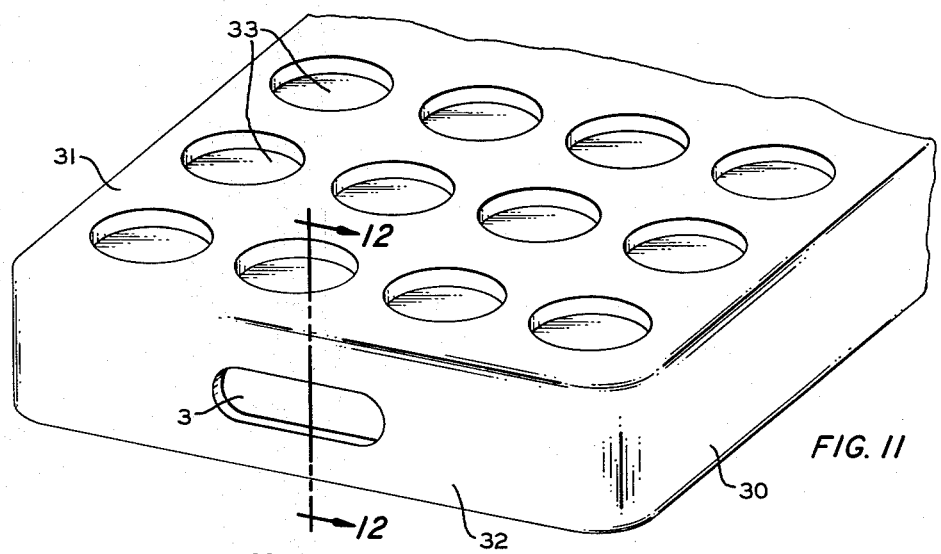
FIG. 11 is a perspective view of a plastic blank from which the several embodiments of the invention may be made.
Figure 12:
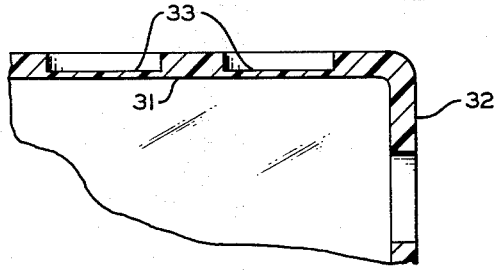
FIG. 12 is a fragmentary elevational section of the blank of FIG. 11.

FIGS. 11 and 12 show the blank from which the box structures of the several embodiments hereinbefore discussed are preferably made. The blank consists of a substantially closed unitary box member 30 of which only the top wall 31 and portions of the side wall 32 are shown. It will be understood that the bottom wall is shaped either as seen in FIGS. 3 and 4, or as indicated in FIG. 6. The box member 30 has but two openings, namely the slots 3 on opposite portions of the side wall. The top wall 31 has molded-in depressions 33 of circular shape under which the thickness of the top wall is greatly reduced so that circular apertures are readily formed in the top wall 31 by removing the recessed portions.

The blank 30 may be molded in any desired manner, and is preferably molded in a single piece having rounded edges and corners. It will be appreciated that the several plastic inserts 2, 6 shown in FIGS. 1 to 5 may also be employed to advantage in the other embodiments illustrated, and that the dishes 8 may be suitably employed with embodiments of the invention differently shaped from that seen in FIG. 8.

While a carrier case for milk bottles has been selected for the purposes of the disclosure, this invention is not limited to any specific type of bottle to be enclosed in the container of the invention, nor to bottles generally. Containers of metal or paper, such as tall cylindrical or conical cans will advantageously be held in containers basically similar to the specific embodiments described and illustrated, and those skilled in the art will undoubtedly find many other applications for devices which may readily be arrived at by following the above teachings.

It should be understood, therefore, that the foregoing disclosure relates to only preferred embodiments of the invention and that it is intended to cover all changes and modifications of the examples of the invention herein chosen for the purpose of the disclosure which do not constitute departures from the spirit and scope of the invention set forth in the appended claims.

What I claim is:
1. A container for bottles and the like comprising
   (a) a one piece box structure including a top wall formed with a plurality of apertures therethrough;
   (b) a bottom wall spaced from said top wall;
   (c) a side wall connecting said top and said bottom walls said side wall extending continuously around said box structure and formed integrally with said top and bottom walls along all edges of said box structure; and
   (d) an annular lip depending from each of said apertures and being coaxial therewith, the axial height of the said depending lips near the said side wall being less than the height of the said lips remote from said side wall.

2. A container for bottles and the like according to claim 1 wherein there is also provided a plurality of integral reinforcing ridges on the face of said bottom wall opposite said top wall, said ridges intersecting to define a plurality of open cells on said face, the center of each of said cells being aligned with the center of a corresponding aperture in said top wall so that said aperture and said cell cooperate to prevent lateral movement of a bottle positioned therein.

3. A container according to claim 2 wherein the said box structure is molded of synthetic plastic material.

4. A container according to claim 2 wherein said side wall is formed with at least one opening therethrough, said opening being elongated in a plane intermediate said top wall and said bottom wall.

5. A container according to claim 4 further comprising a conforming annular insert arranged in said opening, said insert having a peripheral groove engaging said side wall.

6. A container for bottles and the like according to claim 1 wherein there is also provided (a) a plurality of frusto-conical projections upstanding from the plane of said bottom wall, said projections being formed from and displaced from said plane; and (b) said projections and said apertures being coaxially aligned so as to prevent lateral movement of a bottle positioned in said aperture.

7. The container of claim 6 further comprising a plurality of shallow cylindrical dishes coaxially secured to respective ones of said projections, the open sides of said dishes facing said top wall.

8. The container of claim 7 wherein each of said dishes is provided with an axial stem, each of said projections being formed with an axial opening for receiving said stem for securing said stem to said bottom wall.

9. A container for bottles and the like according to claim 1 wherein there is provided a plurality of ridges integrally formed on said top wall intermediate said apertures, said ridges intersecting to form a plurality of cells with said top wall, each of said apertures being substantially centered in one of said cells.

10. A plastic blank for a bottle container, comprising a top wall formed with a plurality of circular recesses having closed bottoms constituted by circular portions of said top wall having a reduced thickness, said recesses being uniformly spaced in a regular pattern; a bottom wall spaced from said top wall; and a side wall connecting said top and said bottom walls, said side wall extending continuously around said blank and formed integrally with said top and bottom walls along all edges of said blank, said side wall being substantially uninterrupted, but formed with at least one opening elongated in a plane intermediate said top wall and said bottom wall.

References Cited by the Examiner

UNITED STATES PATENTS

| | | | |
|---|---|---|---|
| 1,230,985 | 6/1917 | Benson. | |
| 1,948,041 | 2/1934 | McCowan | 220—21 |
| 2,414,171 | 1/1947 | Scharff. | |
| 2,459,921 | 1/1949 | Comer | 220—21 |
| 2,526,716 | 10/1950 | Wales | 220—21 |
| 2,588,805 | 3/1952 | Cross | 220—21 |
| 2,619,251 | 11/1952 | Schmidt | 220—21 |
| 2,787,397 | 4/1957 | Radford | 220—72 |
| 2,830,729 | 4/1958 | Brackett | 220—21 |
| 3,151,762 | 10/1964 | Vidal | 220—21 |

LOUIS G. MANCENE, *Primary Examiner.*

EARLE J. DRUMMOND, THERON E. CONDON, GEORGE O. RALSTON, *Examiners.*